(12) United States Patent
Ruml et al.

(10) Patent No.: US 7,451,132 B2
(45) Date of Patent: Nov. 11, 2008

(54) SYSTEM AND METHOD FOR PRODUCTION PLANNING UTILIZING ON-LINE STATE-SPACE PLANNING

(75) Inventors: Wheeler Ruml, Palo Alto, CA (US); Markus P J. Fromherz, Palo Alto, CA (US)

(73) Assignee: Palo Alto Research Center Incorporated, Palo Alto, CA (US)

(*) Notice: Subject to any disclaimer, the term of this patent is extended or adjusted under 35 U.S.C. 154(b) by 431 days.

(21) Appl. No.: 10/855,936

(22) Filed: May 27, 2004

(65) Prior Publication Data
US 2005/0278303 A1    Dec. 15, 2005

(51) Int. Cl.
*G06F 7/00* (2006.01)
*G06F 17/30* (2006.01)

(52) U.S. Cl. .................. 707/3; 707/3; 707/4; 707/5; 705/8

(58) Field of Classification Search .......... 700/97, 700/100, 103, 104; 707/102, 3, 2, 4; 705/28
See application file for complete search history.

(56) References Cited

U.S. PATENT DOCUMENTS

| | | | |
|---|---|---|---|
| 6,546,300 B1 | 4/2003 | Fukuda et al. | 700/100 |
| 6,591,153 B2 | 7/2003 | Crampton et al. | 700/103 |
| 6,606,527 B2* | 8/2003 | de Andrade et al. | 700/97 |
| 6,606,529 B1 | 8/2003 | Crowder, Jr. et al. | 700/100 |
| 6,807,546 B2* | 10/2004 | Young-Lai | 707/102 |

OTHER PUBLICATIONS

Cheng et al. (Non-Patent Literature: "Data Integration by Describing Sources with Constraint Database"; Xun Cheng, Guozhu Dong, Tzekwan Lau, Jianwen Su; IEEE; Mar. 1999).*
Chekuri et al. (Chekuri hereinafter) (Non-Patent Literature: "An Efficient Approximation Algorithm for Minimizing Makespan on Uniformly Related Machines"; Chandra Chekuri, and Michael Bender; Oct. 3, 2001, State University of New York at Stony Brook, Stony Brook, NY).*
Fikes et al. "STRIPS: A New Approach to the Application of Theorem Proving to Problem Solving", Artificial Intelligence 2(1971) 189-208.

(Continued)

Primary Examiner—Jean M Corrielus
Assistant Examiner—Giovanna Colan
(74) Attorney, Agent, or Firm—Fay Sharpe LLP

(57) ABSTRACT

A combinatorial search method implemented in a computer control system utilizes on-line state-space planning of operations for multi-step production processes. The planner considers various possible combinations of actions, searching for one that correctly transforms the initial state of the object into the specified desired final state. Each combination of actions the planner considers is called a search node, with each node containing a plan representing a series of actions of various machines on a single object and also containing the predicted state of the object with those actions applied either forward or backward. The method includes determining which of the search nodes to extend further at each search iteration and if the object state in the chosen search node conforms to the desired state of the object, or whether actions should be added to the node's plan. Actions that are applicable to the chosen node's object state are selected, transformations are applied to the attributes, and the resulting plan is returned to the system.

36 Claims, 2 Drawing Sheets

OTHER PUBLICATIONS

U.S. Appl. No. XX/XXX,XXX entitled "Exception Handling in Manufacturing Systems Combining On-Line Planning and Predetermined Rules", Wheeler Ruml et al., filed May 27, 2004.

U.S. Appl. No. XX/XXX,XXX entitled "System and Method Utilizing Temporal Constraints to Coordinate Multiple Planning Sessions", Wheeler Ruml et al., filed May 27, 2004.

* cited by examiner

SYSTEM AND METHOD FOR PRODUCTION PLANNING UTILIZING ON-LINE STATE-SPACE PLANNING

CROSS REFERENCE TO RELATED APPLICATIONS

The following copending patents. U.S. Pat. No. 6,898,475 B1, issued May 24, 2005, titled "System and Method Utilizing Temporal Constraints to Coordinate Multiple Planning Sessions", to Ruml et al., and U.S. Pat. No. 7,043,321 B2, issued May 9, 2006, titled "Exception Handling in Manufacturing Systems Combining On-Line Planning and Predetermined Rules", to Ruml et al., are assigned to the same assignee of the present application. The entire disclosures of these patents are totally incorporated herein by reference in their entirety.

INCORPORATION BY REFERENCE

The following U.S. patents are fully incorporated herein by reference: U.S. Pat. No. 6,546,300 ("Production/Manufacturing Planning System"); U.S. Pat. No. 6,591,153 ("System and Methods for Scheduling Manufacturing Resources"); U.S. Pat. No. 6,606,527 ("Methods and Systems for Planning Operations in Manufacturing Plants"); and U.S. Pat. No. 6,606,529 ("Complex Scheduling Method and Device").

BACKGROUND

This disclosure relates generally to a method and system for production/manufacturing planning and scheduling. More specifically the disclosure relates to the on-line state-space planning of operations for manufacturing or production tasks.

Manufacturing systems conventionally require the planning and scheduling of a series of jobs. Because execution of plans requires the use of physical plant resources, planning for later jobs must take into account the resource commitments in plans already released for production. For example, if part 1 is scheduled to use machine 2 for 15 seconds starting at 4:00:00 pm, the plan for part 2 cannot use machine 2 from 4:00:00 to 4:00:15 pm. While production planning and scheduling may be simple for systems that manufacture many identical jobs in an assembly-line fashion, or factories that produce a very small number of custom jobs over a long period of time, it can be extremely difficult in situations involving high-speed custom made-to-order manufacturing, in which different objects may require different processing and the production plan for an object must be created very quickly.

A typical manufacturing plant may be represented as a network of transports linking multiple machines, as shown in FIG. 1. A plant may have anywhere from a few to a several hundred machines and transports. Unfinished blocks of raw material may enter the plant from multiple sources and completed jobs can exit at multiple destinations. In the simplified schematic of FIG. 1, sources 1 and 2 provide materials to Machine 1 and Machine 2, which interface with Machine 3 and Machine 4 as well as Destinations 1 and 2. Transports between sources, machines, and destinations take a known time to convey jobs. Each machine has a limited number of discrete actions it can perform, each of which has a known duration and transforms its input in a known deterministic way.

From a planning perspective, jobs can move through the plant as illustrated in FIG. 2. A job request specifies a desired final configuration, which may be achievable by several different sequences of actions. For example, in FIG. 2 material may be procured from source S1 to be received and processed by machine M1 utilizing either a first or second operation Act1 or Act2. At the completion of either Act1 or Act2, materials may be sent to destination D1, to machine M3, or to machine M2 for further processing. The plant might operate at high speed, with multiple job requests arriving per second, possibly for many hours. Clearly, a fast, automated procedure is necessary to coordinate production, and one that optimizes the throughput of the plant would be advantageous.

Furthermore, additional scheduling constraints may be present. In many situations of interest, jobs are grouped into batches. A batch is an ordered set of jobs, all of which must eventually arrive in order at the same destination. Multiple batches may be in production simultaneously, although because jobs from different batches are not allowed to interleave at a single destination, the number of concurrent batches is limited by the number of destinations.

Occasionally a machine or transport will break down, in effect changing the planning domain by removing the related actions. The plant is also intentionally reconfigured periodically. This means that precomputing a limited set of canonical suboptimal plans and limiting on-line computation to scheduling only is not desirable. For a large plant of 200 machines, there are infeasibly many possible broken configurations to consider. Depending on the capabilities of the machines, the number of possible job requests may also make precomputation infeasible.

The planner must accept a stream of job specifications that arrive asynchronously over time and produce a plan for each job. Each plan is a sequence of actions labeled with start times. The plant controller executes the plans it is given and reports any failures. Due to communication and processing delays, any plan that is returned by the planner must start later than a certain time past the current instant.

Typically there are many feasible plans for any given job request; the problem is finding one that finishes quickly. The optimal plan for a job depends not only on the job request, but also on the resource commitments present in previously-planned jobs. Existing approaches to this problem require the enumeration of all possible plans at machine start-up, with retrieval of a suitable plan for each job request and then scheduling of the necessary actions. However, the large number of potential plans in more complex plants makes an on-line planning system desirable.

BRIEF SUMMARY

The disclosed embodiments provide examples of improved solutions to the problems noted in the above Background discussion and the art cited therein. There is shown in these examples an improved combinatorial search method implemented in a computer control system for utilizing on-line state-space planning of operations for multi-step production processes. Multiple candidate plans may be considered, with each plan representing a series of actions of various machines on a single object. In one embodiment, the plans are constructed starting from the specified final object state and working backwards through time in an attempt to reach the known starting object state. In another embodiment, the plans are constructed starting from the known starting object state, working forwards through time in an attempt to reach the desired final state. In each embodiment, the candidate plans are stored with the predicted state of the object. The method includes consideration of one candidate plan at a time, namely, determining if the predicted object state conforms to the desired state of the object, and if not, forming all the possible ways the plan can be augmented with an additional action. Actions are modeled as transforming the predicted state of the object. Each possible additional action results in a new candidate plan and corresponding predicted object state.

In another embodiment there is disclosed a combinatorial search system implemented in a computer control system for utilizing on-line state-space planning of operations for multi-step production processes. Multiple candidate plans may be considered, with each plan representing a series of actions of various machines on a single object. In one embodiment, the plans are constructed starting from the specified final object state and working backwards through time in an attempt to reach the known starting object state. In another embodiment, the plans are constructed starting from the known starting object state, working forwards through time in an attempt to reach the desired final state. In each embodiment, the system stores the candidate plans with the predicted state of the object. The system includes consideration of one candidate plan at a time, namely, determining if the predicted object state conforms to the desired state of the object, and if not, forming all the possible ways the plan can be augmented with an additional action. Actions are modeled as transforming the predicted state of the object. Each possible additional action results in a new candidate plan and corresponding predicted object state.

In yet another embodiment there is disclosed an article of manufacture in the form of a computer usable medium having computer readable program code embodied in the medium which, causes the computer to perform method steps for a combinatorial search method implemented in a computer control system for utilizing on-line state-space planning of operations for multi-step production processes. Multiple candidate plans may be considered, with each plan representing a series of actions of various machines on a single object. In one embodiment, the plans are constructed starting from the specified final object state and working backwards through time in an attempt to reach the known starting object state. In another embodiment, the plans are constructed starting from the known starting object state, working forwards through time in an attempt to reach the desired final state. In each embodiment, the candidate plans are stored with the predicted state of the object. The method includes consideration of one candidate plan at a time, namely, determining if the predicted object state conforms to the desired state of the object, and if not, forming all the possible ways the plan can be augmented with an additional action. Actions are modeled as transforming the predicted state of the object. Each possible additional action results in a new candidate plan and corresponding predicted object state.

BRIEF DESCRIPTION OF THE DRAWINGS

The foregoing and other features of the embodiments described herein will be apparent and easily understood from a further reading of the specification, claims and by reference to the accompanying drawings in which:

DETAILED DESCRIPTION

Figure 1:
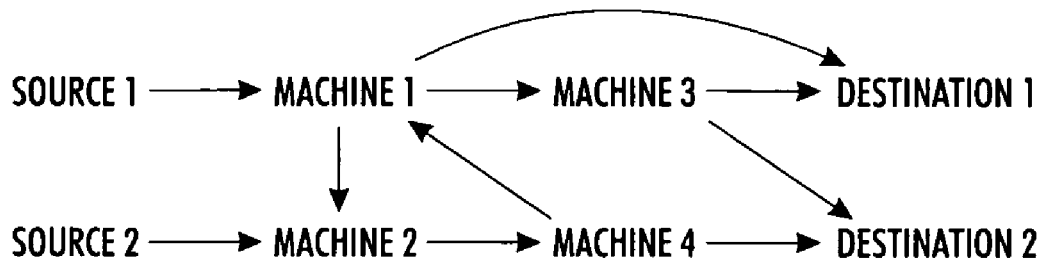
FIG. 1 is a schematic diagram of an example manufacturing plant.
Figure 2:
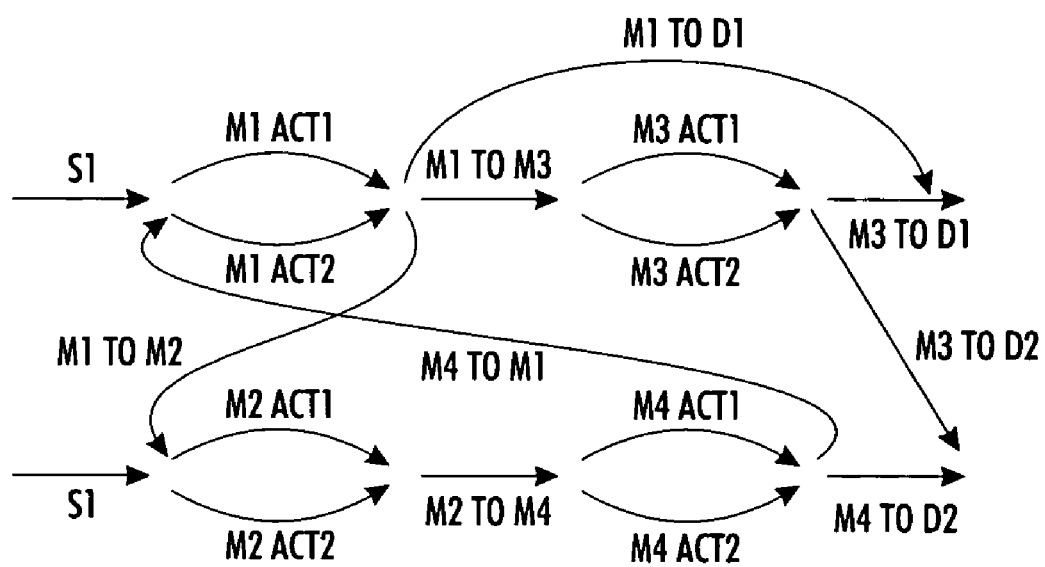
FIG. 2 is a schematic diagram of possible job flow within the manufacturing plant of FIG. 1.

Disclosed herein are a method and system that perform on-line state-space planning and scheduling. In contrast to existing approaches to planning and scheduling for manufacturing and production operations, the system and method described herein is made possible by generating plans on-line in response to job requests. Rather than pre-computing plans before production begins, plans are constructed quickly as needed. The method utilizes a combinatorial search procedure to generate possible plans and choose from among them the best one that results in the desired object being produced by the plant. The plant is represented by the set of its capabilities, with each capability being a discrete action that a machine in the plant can perform on an object in production. For the purposes of the present invention, actions are modeled as transformations of logical attributes of an object (e.g. location, surface color, shape, etc.), with all actions modeled as changing the attributes of an object. The planning process identifies, for a given job request, a sequence of actions that transforms the initial state of the object to a desired final configuration.

The system and method apply to control software used for multi-step production processes such as manufacturing, printing, or assembly and provide for the handling of complex operations over complex paths to provide flexible routing, optimal productivity, and optimal load balancing. In the following description numerous specific details are set forth in order to provide a thorough understanding of the system and method. It would be apparent, however, to one skilled in the art to practice the system and method without such specific details. In other instances, specific implementation details have not been shown in detail in order not to unnecessarily obscure the present invention.

Various computing environments may incorporate generative state-space planning functionality. The following discussion is intended to provide a brief, general description of suitable computing environments in which the concurrent planning and scheduling method and system may be implemented. Although not required, the method and system will be described in the general context of computer-executable instructions, such as program modules, being executed by a single computer. Generally, program modules include routines, programs, objects, components, data structures, etc. that perform particular tasks or implement particular abstract data types. Moreover, those skilled in the art will appreciate that the method and system may be practiced with other computer system configurations, including hand-held devices, multi-processor systems, microprocessor-based or programmable consumer electronics, networked PCs, minicomputers, mainframe computers, and the like.

The method and system may also be practiced in distributed computing environments where tasks are performed by remote processing devices that are linked through a communications network. In a distributed computing environment, program modules may be located in both local and remote memory storage devices.

Although the method and system described herein is not limited to embedded applications, the following discussion will pertain to embedded systems for purposes of example only. One skilled in the art will appreciate that the planning and scheduling method and system is useful for many complex control problems, generic software solutions to a wide variety of programming problems, flexible programs that separate the model from its solution, and wherever formulation as constraint problems is natural for expression of domain knowledge. Additionally, it may be practiced in a multitude of computing environments.

The present method is based on combinatorial search. That is to say, the planner considers various possible combinations of actions, searching for one that correctly transforms the initial state of the object (including its attributes such as location) into the specified desired final state of the object. Each combination that the planner considers is called a 'node'. Each node contains a series of actions (a plan) and the predicted state of the object after those actions have been applied. The search involves generating, for a given node, all the possible ways of adding a single action to that node's plan. These augmented plans then form new search nodes, which are called 'children' of the original node. For expository purposes, we will illustrate the current method using one particular implementation in which the planner proceeds by searching backwards in time. The combinations are thus generated by starting from a node that contains an empty plan having no actions and also the desired final state of the object. Taking the example of a printing system, the desired final state might involve a sheet of paper being in a particular output tray with a particular image on the front side. The planner then considers all actions whose effects are consistent with that final state of the object. In our printing example, there might be two different transport actions that can result in a sheet being located in the desired output tray. The planner generates new nodes corresponding to these two possibilities. Each node contains a different plan, consisting of the single corresponding action, and a different predicted state of the object, corresponding to the different locations from which the different transport actions can move a sheet to the desired output tray. These new nodes are the children of the initial node.

The planner maintains a list of generated nodes, and iteratively removes a promising node from the list, considers all legal actions that could be prefixed to its plan, and generates the child nodes resulting from those possible actions. In this way, the planner searches backwards through time, considering the possible combinations of actions. Whenever the state of the object in a node corresponds to the initial state, the planner can return the associated plan.

Much academic work has considered state-space planning backward through time. However, previous work has been concerned with cases in which a single machine or agent is acting on multiple objects. The plan represents the actions of this single machine in its environment and the state in each node represents the state of the world. Furthermore, such planning takes place before the agent begins to act. The disclosure herein is directed to the novel specialization and application of these general concepts to the problem of manufacturing and production operations. In the present disclosure, the plan represents the actions of multiple machines on a single object and the state in each node represents only the state of the object. In contrast with previous work, the machines are likely to be already in operation processing previous jobs during the planning for a new job, and the world consists of many objects being manipulated simultaneously.

The state in each search node consists of the set of attributes of the object. It may also contain scheduling information, such as times or abstract time points for each action in that node's plan. Additionally, it may contain resource usage information, where a resource is a part of the machine that can be used by only one action at a time. Because each child node modifies the parent node's job state differently or introduces different resource constraints, the state at each search node is unique and it is not necessary to consider the problem of duplicated search effort resulting from reaching the same state by different paths in the tree of search nodes. The domain may be specified as a set of actions written in a progression style, such as the standard style of STRIPS [Richard E. Fikes and Nils J. Nilsson, "STRIPS: A New Approach to the Application of Theorem Proving to Problem Solving," Artificial Intelligence, 2(1971) 189-208.], in which an input state is transformed into an output state and preconditions declare when an action can be applied. Alternatively, the domain may be specified in a regression style, i.e., declaring transformations applied backwards. If a domain specification in progression style is used, the use of regression requires modification of the action specifications. When the domain is initially parsed, action specifications are rearranged into new sets of preconditions and effects for use in regression. The new preconditions are the effects of the original action as well as those preconditions that are not touched by the effects. The remaining original preconditions are the effects of the rearranged action.

Figure 3:
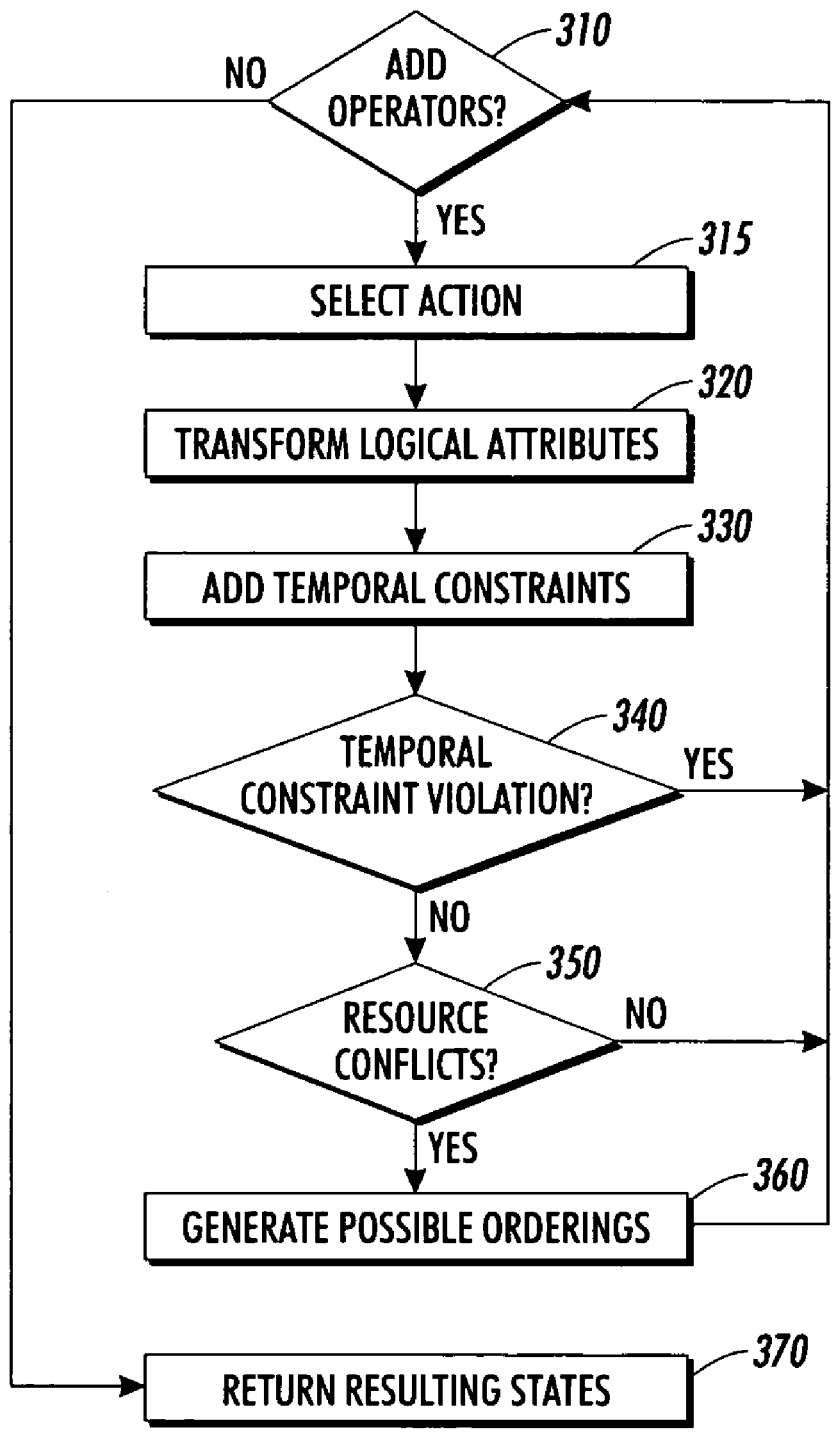
FIG. 3 provides a flow diagram detailing an example embodiment of the flow of operations to accomplish planning and scheduling for individual jobs.

It will be clear to those skilled in the art that many different combinatorial search techniques can be used to select which search node to expand at each step of the planner's operation. One contribution of the present disclosure concerns the contents of the search nodes (namely, the candidate production plan and corresponding object state) and how the child nodes are generated. FIG. 3 illustrates an example embodiment of the flow of operations to accomplish planning and scheduling for an individual job. For illustrative purposes, we discuss the embodiment in which the planner works backwards through time.

The search starts with the desired end state. In a first step (310), it is checked whether the current state conforms to the known object initial state (e.g., raw material in a feeding location), or whether there are actions (also known as operators) that should be added to the plan in order to generate new nodes which might be closer to the desired initial state. Since the planner may have generated multiple search nodes in the past, it also determines at 310 which of the current nodes to extend further. If the chosen node conforms to the desired state, the search is done and the plan in the chosen node is returned. Otherwise, an applicable action is chosen (315). The state typically contains attributes, such as attributes describing the job (e.g., an orientation, color, shape, and modifications), and the action may specify transformations to these attributes. Any such transformations are applied at 320.

In addition to these attribute transformations, an action may have various temporal constraints that need to be taken into account. In an optional operation at 330, temporal aspects of the action are considered. For instance, the time of the new action might need to be constrained to occur a certain amount before the start time of the next action, according to the action's duration. Depending on the details of the temporal constraints, it may be necessary to constrain the start time of the new action to be sufficiently far in the future for the plan to be valid. Then at 340, the optional operation 330 is continued: using the temporal database, a checking operation is performed if necessary to determine whether the posting of these temporal constraints at 330 leads to any violations with other constraints. If yes, the current way of extending the chosen search node can be abandoned and an alternative action can be considered immediately (310).

Otherwise, an additional optional operation 350 can be performed. At 350 the action's resource allocations (reservations for resources that can be used only by one action at a time) can be posted and checked, using the same temporal database as for action times at 330. Multiple allocations for the same resource eventually have to be resolved by ordering the allocations, i.e., one action must occur before or after another action using the same resource. This optional operation is continued at 360: any potential overlaps in allocations for the same resource can be resolved immediately if desired at 360 by posting temporal constraints to order any potentially overlapping allocations (e.g., to force an action to occur before another action using the same resource) and these changes propagate to the action times. Each possible ordering leads to a separate child search node. Because multiple orderings may be possible, there may be many resulting child search nodes.

It will be clear to those skilled in the art that many different combinatorial search techniques can be used to select which search node to expand at each step 310 of the planner's operation. For clarity, we will discuss the A* search method, but this is not meant to exclude other known approaches such as depth-first search. A* search uses an evaluation function to estimate the promise of each generated search node and always examines next the node with the best evaluation score.

The evaluation function used to evaluate the promise of a partial plan at 310 is primarily the earliest possible end time of the plan. In the event of ties, the makespan (temporal extent, from start to end) of the plan is minimized. To improve estimates of these quantities, a computation provides a simple lower bound on the additional makespan (minimal amount of time) required to complete the plan. We then compute the fastest way to achieve each of the preconditions of the earliest action in the plan at 360, starting from the initial state and ignoring negative effects and resource constraints. Our lower bound is then the maximum over the estimates for the individual preconditions. This lower bound is then inserted before the first action in the plan and after the earliest plan start time, and may thus change the end time of the plan in addition to the makespan. It may also introduce an inconsistency, in which case the plan can be abandoned (since it cannot lead to a better plan than other plans currently being contemplated). Any remaining ties between search nodes after considering end time and makespan are broken in favor of the node that had the larger realized makespan so far before the addition of the lower bound. A plan is considered complete if its attributes unify with the desired initial state (310), i.e., when the repeated application of actions starting with the desired end state resulted in an allowed start state, such as the feeding of the stock material. At that point the resulting states are returned to the system at 370. While the objective for the optimal plan in this case was the earliest possible end time of the plan, other objectives may be used. Any such objectives, such as optimal load balancing between different resources, are fully contemplated in this application.

In addition to unit-capacity resource constraints (where actions using the resource can never overlap), some actions may require state constraints, in which two allocations for the same resource may overlap only if they both request that the resource be in the same state. Also some actions allow their duration to be specified within a given range, i.e., the planner/scheduler is free to choose any duration within the range. This is easily accommodated by the framework presented herein and is fully contemplated by the specification and scope of the claims herein.

While the present discussion has been illustrated and described with reference to specific embodiments, further modification and improvements will occur to those skilled in the art. Additionally, "code" as used herein, or "program" as used herein, is any plurality of binary values or any executable, interpreted or compiled code which can be used by a computer or execution device to perform a task. This code or program can be written in any one of several known computer languages. A "computer", as used herein, can mean any device which stores, processes, routes, manipulates, or performs like operation on data. It is to be understood, therefore, that this disclosure is not limited to the particular forms illustrated and that it is intended in the appended claims to embrace all alternatives, modifications, and variations which do not depart from the spirit and scope of the embodiments described herein.

What is claimed:

1. A combinatorial search method for on-line state-space planning of operations for multi-step production processes, wherein the method is performed by a planner residing within a computer control system having a memory storage, wherein the planner considers various possible combinations and sequences of actions to transform an object from one state into the specified desired final state described in at least one job request, wherein each combination of actions the planner considers is called a search node, with each node containing a plan representing a series of actions on a single object and also containing the predicted state of the object with those actions applied either forward or backward, wherein the state of the object consists of the set of attributes of the object, the method comprising:

generating an initial search node for an object, wherein said internal search node contains an empty production plan and a current object state, wherein said current object state corresponds to either the raw material of the production line if forward planning is utilized or the finished product if backward planning is utilized;

inserting said generated initial search node into a data structure that holds candidate search nodes;

selecting one of said candidate search nodes in said data structure to extend further;

removing said selected candidate search node from said data structure;

determining if the object state in said selected candidate search node conforms to a goal object state, or whether actions should be added to said selected search node's plan, wherein said goal object state comprises either a specified desired final finished state of the object if forward planning is utilized or the starting state of the object if backward planning is utilized;

considering all actions compatible with said current object state, wherein actions are modeled in part as transformations of attributes of an object;

generating at least one new search node, wherein each said new search node contains a production plan including one of said actions and a predicted object state corresponding to applying said one of said actions;

inserting said at least one new search node into said data structure;

repeating selecting a new candidate search node, determining if the object state in said selected candidate search node conforms to a goal object state, and considering all actions compatible with said current object state until the state of said object for at least one child node candidate plan corresponds to said goal object state;

returning said child node candidate production plan that corresponds to said goal object state to the control system for implementation of multi-step production for said object; and storing said returned child node candidate production plan in the memory storage of the computer system.

2. The combinatorial search method implemented in a computer control system for utilizing on-line state-space planning of operations for multi-step production processes according to claim 1, further comprising incorporating temporal constraints for each one of said applicable actions, comprising:
    applying time constraints;
    determining whether the posting of the time constraints leads to a violation with other constraints in the temporal constraint database, and;
    propagating said revised time constraints to the action times.

3. The combinatorial search method implemented in a computer control system for utilizing on-line state-space planning of operations for multi-step production processes according to claim 1, further comprising incorporating resource allocations for each one of said applicable actions, comprising:
    posting said action's resource allocations, wherein said resource allocations comprise unit-capacity resource constraints;
    checking said action's resources allocation against said temporal constrain database:
    resolving potential overlaps in said resource allocations; and
    posting said revised time constraints to order any potentially overlapping allocations.

4. The combinatorial search method implemented in a computer control system for utilizing on-line state-space planning of operations for multi-step production process according to claim 1, wherein said selected applicable action is instantiated, comprising:
    inheriting a previous action's start time point as anew action's end time point; and
    creating a new time point to represent said new action's start time.

5. The combinatorial search method implemented in a computer control system for utilizing on-line state-space planning of operations for multi-step production processes according to claim 2, wherein setting said time constraints comprises constraining a start time to occur before the end time of said selected action's duration and after the time predicted to be required for planning the job.

6. The combinatorial search method implemented in a computer control system for utilizing on-line state-space planning of operations for multi-step production processes according to claim 5, wherein selected action receives its own end time point, which is constrained to occur after the end point of the previous job in the batch, if no actions are already in the plan.

7. The combinatorial search method implemented in a computer control system for utilizing on-line state-space planning of operations for multi-step production processes according to claim 3, wherein multiple allocations are resolved by ordering the allocations, wherein one action must occur before or after another action using the same resource.

8. The combinatorial search method implemented in a computer control system for utilizing on-line state-space planning of operations for multi-step production processes according to claim 3, wherein ordering overlapping allocations comprises forcing an action to occur before another action using the same resource.

9. The combinatorial search method implemented in a computer control system for utilizing on-line state-space planning of operations for multi-step production processes according to claim 3, wherein ordering overlapping allocations comprises minimizing a makespan of the plan in the event of ties in plan end times, wherein said makespan comprises the temporal extent of the plan, from start to end.

10. The combinatorial search method implemented in a computer control system for utilizing on-line state-space planning of operations for multi-step production processes according to claim 1, further comprising computing a lower bound on said makespan required to complete the plan.

11. The combinatorial search method implemented in a computer control system for utilizing on-line state-space planning of operations for multi-step production processes according to claim 10, where in computing said lower bound comprises beginning from the initial state and ignoring negative effects and resource constraints.

12. The combinatorial search method implemented in a computer control system for utilizing on-line state-space planning of operations for multi-step production processes according to claim 1, further comprising posting said action's state constraints, wherein two allocations for the same resource may overlap only if they both request that the resource be in the same state.

13. The combinatorial search method implemented in a computer control system for utilizing on-line state-space planning of operations for multi-step production processes according to claim 3, wherein said action's resource allocations specify performance of said action within a selected time duration.

14. The combinatorial search method implemented in a computer control system for utilizing on-line state-space planning of operations for multi-step production processes according to claim 1, wherein the combinatorial search technique applied is A* search.

15. The combinatorial search method implemented in a computer control system for utilizing on-line state-space planning of operations for multi-step production processes according to claim 1, wherein the combinatorial search technique applied is depth-first search.

16. The combinatorial search method implemented in a computer control system for utilizing on-line state-space planning of operations for multi-step production processes according to claim 1, wherein the multistep production process comprises a printing system.

17. The combinatorial search method implemented in a computer control system for utilizing on-line state-space planning operations for multi-step production processes according to claim 1, wherein the multistep production process comprises a manufacturing process.

18. The combinatorial search method implemented in a computer control system for utilizing on-line state-space planning of operations for multi-step production processes according to claim 1, wherein the multistep production process comprises an assembly operation.

19. A computer system configured to execute a combinatorial search for on-line state-space planning of operations for multi-step production processes, wherein a planner resides within a memory storage of the computer system, and the planner considers various possible combinations and sequences of actions to transform an object from one state into the specified desired final state, wherein each combination of actions the planner considers is called a search node, with each node containing a plan representing a series of actions on a single object and also containing the predicted state of the object with those actions applied either forward or backward, wherein the state of the object consists of the set of attributes of the object, the computer system comprising:
    means for generating an initial search node for an object, wherein said initial search node contains an empty production plan and a current object state, wherein said current object state corresponds to either the raw material of the production line if forward planning is utilized or the finished product if backward planning is utilized;

means for inserting said generated initial search node into a data structure that holds candidate search nodes;

means for selecting one of said candidate search nodes in said data structure to extend further;

means for removing said selected candidate search node from said data structure;

means for determining if the object state in said selected candidate search node conforms to a goal object state, or whether actions should be added to said selected search node's plan, wherein said goal object state comprises either a specified desired final finished state of the object if forward planning is utilized or the starting state of the object if backward planning is utilized;

means for considering all actions compatible with said current object state, wherein said actions are modeled in part as transformations of attributes of an object;

means for generating at least one new search node, wherein each said new search node contains a production plan including one of said actions and a predicted object state corresponding to applying said one of said actions;

means for inserting said at least one new search node into said data structure;

means for repeating selecting a new candidate search node, determining if the object state in said selected candidate search node conforms to a goal object state, and considering all actions compatible with said current object state until the state of said object for at least one child node candidate plan corresponds to said goal object state;

means for returning said child node candidate production plan that corresponds to said goal object state to the computer system for implementation of multi-step production processes for said object; and a memory storage of the computer system configured to store the returned said child node candidate production plan.

20. The computer system for utilizing on-line state-space planning of operations for multi-step production processes according to claim 19, further comprising incorporating temporal constraints for each of said applicable actions, comprising:

means for applying time constraints;

means for determining whether the posting of the time constraints leads to a violation with other constraints in the temporal constraint database, and;

means for propagating said revised time constraints to the action times.

21. The computer system for utilizing on-line state-space planning of operations for multi-step production processes according to claim 19, further comprising incorporating resource allocations for each one of said applicable actions, comprising:

means for posting said action's resource allocations, wherein said resource allocations comprise unit-capacity resource constraints;

means for checking said action's resource allocation against said temporal constraint database;

means for resolving potential overlaps in said resource allocations; and means for posting said revised time constraints to order any potentially overlapping allocations.

22. The computer system for utilizing on-line state-space planning of operations for multi-step production processes according to claim 19, wherein said selected applicable action is instantiated, comprising:

means for inheriting a previous action's start time point as a new action's end time point; and means for creating a new time point to represent said new action's start time.

23. The computer system for utilizing on-line state-space planning of operations for multi-step production processes according to claim 19, wherein setting said time constraints comprises constraining a start time to occur before the end time of said selected action's duration and after the time predicted to be required for planning the job.

24. The computer system for utilizing on-line state-space planning of operations for multi-step production processes according to claim 21, wherein said selected action receives its own end time point which is constrained to occur after the end point of the previous job in the batch, if no actions are already in the plan.

25. The computer system for utilizing on-line state-space planning of operations for multi-step production processes according to claim 19, wherein multiple allocations are resolved by ordering the allocations, wherein one action must occur before or after another action using the same resource.

26. The computer system for utilizing on-line state-space planning of operations for multi-step production processes according to claim 19, wherein ordering overlapping allocations comprises forcing an action to occur before another action using the same resource.

27. The computer system for utilizing on-line state-space planning of operations for multi-step production processes according to claim 19, wherein ordering overlapping allocations comprises minimizing a makespan of the plan in the event of ties in plan end times, wherein said makespan comprises the temporal extent of the plan, from start to end.

28. The computer system for utilizing on-line state-space planning of operations for multi-step production processes according to claim 18, further comprising computing a lower bound on said makespan required to complete the plan.

29. The computer system for utilizing on-line state-space planning of operations for multi-step production processes according to claim 28, wherein computing said lower bound comprises beginning from the initial state and ignoring negative effects and resource constraints.

30. The computer system for utilizing on-line state-space planning of operations for multi-step production processes according to claim 19, further comprising posting said action's state constraints, wherein two allocations for the same resource may overlap only if they both request that the resource be in the same state.

31. The computer system for utilizing on-line state-space planning of operations for multi-step production processes according to claim 19, wherein said action's resource allocations specify performance of said action within a selected time duration.

32. The computer system for utilizing on-line state-space planning of operations for multi-step production processes according to claim 19, wherein a combinatorial search technique applied is A* search.

33. The computer system for utilizing on-line state-space planning of operations for multi-step production processes according to claim 19, wherein a combinatorial search technique applied is depth-first search.

34. The computer system for utilizing on-line state-space planning of operations for multi-step production processes according to claim 19, wherein the multi-step production process comprises a printing system.

35. The computer system for utilizing on-line state-space planning of operations for multi-step production processes according to claim 19, wherein the multi-step production process comprises a manufacturing process.

36. The computer system for utilizing on-line state-space planning of operations for multi-step production processes according to claim 19, wherein the multi-step production process comprises an assembly operation.

* * * * *